United States Patent
Ji et al.

(10) Patent No.: US 8,688,041 B2
(45) Date of Patent: *Apr. 1, 2014

(54) METHODS AND APPARATUS FOR SECURE, PORTABLE, WIRELESS AND MULTI-HOP DATA NETWORKING

(75) Inventors: Lusheng Ji, Silver Spring, MD (US); Jonathan Agre, Brinklow, MD (US); Arunesh Mishra, Greenbelt, MD (US); Sohil Thakkar, Greenbelt, MD (US)

(73) Assignee: Fujitsu Limited, Kawasaki (JP)

( * ) Notice: Subject to any disclaimer, the term of this patent is extended or adjusted under 35 U.S.C. 154(b) by 453 days.

This patent is subject to a terminal disclaimer.

(21) Appl. No.: 12/976,796

(22) Filed: Dec. 22, 2010

(65) Prior Publication Data

US 2011/0099611 A1    Apr. 28, 2011

Related U.S. Application Data

(60) Continuation of application No. 12/053,414, filed on Mar. 21, 2008, now Pat. No. 7,881,667, which is a division of application No. 10/463,857, filed on Jun. 18, 2003, now Pat. No. 7,634,230.

(60) Provisional application No. 60/428,700, filed on Nov. 25, 2002.

(51) Int. Cl.
*H04B 7/00* (2006.01)

(52) U.S. Cl.
USPC .......................................... 455/41.2; 370/331

(58) Field of Classification Search
USPC ................. 455/41.2, 411, 435.1; 370/331
See application file for complete search history.

(56) References Cited

U.S. PATENT DOCUMENTS

| | | | |
|---|---|---|---|
| 5,768,381 A | 6/1998 | Hawthorne | |
| 5,822,309 A | 10/1998 | Ayanoglu et al. | 370/315 |
| 6,185,612 B1 | 2/2001 | Jensen et al. | |
| 6,453,159 B1 | 9/2002 | Lewis | |
| 6,850,503 B2 | 2/2005 | Dorenbosch et al. | |
| 6,879,574 B2 | 4/2005 | Naghian et al. | |
| 6,925,069 B2 | 8/2005 | Koos, Jr. et al. | |
| 6,947,768 B2 | 9/2005 | Adachi et al. | |
| 7,155,518 B2 | 12/2006 | Forslow | |
| 7,177,646 B2 | 2/2007 | O'Neill et al. | |
| 7,181,214 B1 | 2/2007 | White | |

(Continued)

FOREIGN PATENT DOCUMENTS

| | | |
|---|---|---|
| JP | 9-8827 | 1/1997 |
| JP | 09-083528 | 3/1997 |

(Continued)

OTHER PUBLICATIONS

Chinese Office Action dated Jul. 20, 2011 issued in copending Chinese Patent Application No. 201010145184.2.

(Continued)

*Primary Examiner* — Creighton Smith
(74) *Attorney, Agent, or Firm* — Staas & Halsey LLP

(57) ABSTRACT

A mobile network solution provides secure and portable wireless networking service to mobile users with devices equipped with wireless network interfaces. The Secure Nomadic Wireless Network, or SNOWNET, follows a hierarchical approach. Special SNOWNET nodes are deployed in the area where networking service is needed and form a backbone network. At the same time, SNOWNET nodes provide local access service to regular mobile clients. SNOWNET provides security through authentication of the nodes and clients, as well as through encryption of the data.

10 Claims, 10 Drawing Sheets

(56) References Cited

U.S. PATENT DOCUMENTS

| | | | |
|---|---|---|---|
| 7,206,294 | B2 | 4/2007 | Garahi et al. |
| 7,496,344 | B2 | 2/2009 | Stadelmann et al. |
| 7,664,119 | B2 | 2/2010 | Adams et al. |
| 2001/0033556 | A1 | 10/2001 | Krishnamurthy et al. |
| 2002/0031086 | A1 | 3/2002 | Welin |
| 2002/0138440 | A1 | 9/2002 | Vaidyanathan et al. |
| 2002/0143855 | A1 | 10/2002 | Traversat et al. |
| 2002/0151300 | A1 | 10/2002 | Suda et al. |
| 2002/0183038 | A1 | 12/2002 | Comstock et al. |
| 2003/0016678 | A1 | 1/2003 | Maeno |
| 2003/0126262 | A1 | 7/2003 | Yoshida et al. |
| 2004/0005878 | A1 | 1/2004 | Olin et al. ............ 455/414.1 |
| 2004/0064693 | A1 | 4/2004 | Pabla et al. |
| 2004/0078480 | A1 | 4/2004 | Boucher et al. |
| 2004/0139201 | A1 | 7/2004 | Chaudhary et al. |
| 2004/0203698 | A1 | 10/2004 | Comp |
| 2004/0252715 | A1 | 12/2004 | Noda |
| 2006/0052085 | A1 | 3/2006 | Rodriguez et al. |
| 2006/0117113 | A1 | 6/2006 | Elliott et al. |

FOREIGN PATENT DOCUMENTS

| | | |
|---|---|---|
| JP | 2000-078147 | 3/2000 |
| JP | 2000-252992 | 9/2000 |
| JP | 2000-253037 | 9/2000 |
| JP | 2001-237764 | 8/2001 |
| JP | 2003-198568 | 7/2003 |
| JP | 2003-249944 | 9/2003 |
| JP | 2004-253143 | 7/2004 |
| JP | 2005-525716 | 8/2005 |
| WO | WO 02/28026 | 4/2002 |
| WO | 03/023638 | 3/2003 |

OTHER PUBLICATIONS

Advisory Action dated Aug. 8, 2011, issued in copending U.S. Appl. No. 10/929,772.

Office Action dated Oct. 1, 2012, issued in copending U.S. Appl. No. 12/929,662.

Chinese Office Action dated Feb. 6, 2012 issued in copending Chinese Patent Application No. 201010145184.2.

Office Action dated May 11, 2012, issued in copending U.S. Appl. No. 10/929,772.

Office Action dated Feb. 15, 2012, issued in copending U.S. Appl. No. 12/929,662.

Chinese Office Action dated Dec. 7, 2007 in corresponding Chinese Patent Application No. 200310115416X.

"Ad Hoc Wireless Networks and Relevant Routing Protocols", World Telecommunications 2001, No. 5, pp. 38-40, and 48.

Chinese Office Action dated Jan. 23, 2009 for corresponding Chinese Patent Application No. 200310115416.X.

Japanese Office Action dated Jun. 17, 2008 in corresponding Japanese Patent Application No. 2003-393906 (2 pages).

Chinese Office Action dated Jan. 26, 2011 issued in copending Chinese Patent Application No. 201010145184.2.

Office Action dated Feb. 5, 2009 for corresponding U.S. Appl. No. 10/929,772.

Office Action dated Apr. 15, 2008 for corresponding U.S. Appl. No. 10/929,772.

Office Action dated Oct. 10, 2007 for corresponding U.S. Appl. No. 10/463,857.

Office Action dated Apr. 21, 2008 for corresponding U.S. Appl. No. 10/463,857.

Office Action dated Aug. 29, 2008 for corresponding U.S. Appl. No. 10/463,857.

Office Action dated Oct. 9, 2008 for corresponding U.S. Appl. No. 10/463,857.

Office Action dated Apr. 8, 2009 for corresponding U.S. Appl. No. 10/463,857.

Office Action dated Sep. 17, 2009 for corresponding U.S. Appl. No. 10/463,857.

Office Action dated Oct. 19, 2009 for corresponding U.S. Appl. No. 10/463,857.

Chinese Office Action dated Sep. 4, 2009 in corresponding Chinese Patent Application No. 200310115416.X.

Thierry Ernst, "Network Mobility Support Terminology draft-ernst-monet-terminology-01.txt", Jul. 31, 2002, pp. 4-10.

Chinese Notice of Allowance dated Jan. 8, 2010 in corresponding Chinese Patent Application No. 200310115416.X.

Office Action dated Oct. 7, 2009, issued in copending U.S. Appl. No. 10/929,772.

Office Action dated Aug. 31, 2010, issued in copending U.S. Appl. No. 10/929,772.

Office Action dated Mar. 16, 2010, issued in copending U.S. Appl. No. 10/929,772.

Office Action dated Sep. 29, 2010, issued in copending U.S. Appl. No. 12/053,414.

Office Action dated Jun. 26, 2009, issued in copending U.S. Appl. No. 12/053,414.

Office Action dated Oct. 26, 2009, issued in copending U.S. Appl. No. 12/053,414.

Office Action issued in co-pending U.S. Appl. No. 10/929,772, dated Mar. 7, 2011.

Office Action issued in co-pending U.S. Appl. No. 12/929,662, dated Jul. 18, 2011.

Japanese Office Action dated May 18, 2010 issued in copending Japanese Patent Application No. 2003-393906.

Japanese Office Action dated May 25, 2010 issued in corresponding Japanese Patent Application No. 2004-290631.

U.S. Appl. No. 10/929,772, filed Aug. 31, 2004, Lusheng Ji et al., Fujitsu limited.

U.S. Appl. No. 12/929,662, filed Feb. 7, 2011, Lusheng Ji et al., Fujitsu limited.

Office Action dated Oct. 13, 2011, issued in copending U.S. Appl. No. 10/929,772.

Office Action dated May 9, 2013, issued in copending U.S. Appl. No. 12/929,662.

Office Action dated Jan. 24, 2013, issued in copending U.S. Appl. No. 10/929,772.

| Bridge | Local Interface | Neighbor Interface | Destination Addresses |
|---|---|---|---|
| B1 | AP1 | Null | C1, AP1 |
|    | B1  | B3   | C2,C3,C4,C5, B2,AP2,B3,AP3 |
|    |     | Null | B1 |
| B2 | AP2 | Null | C2,C3,AP2 |
|    | B2  | B3   | C1,C4,C5,B1,AP1,B3,AP3 |
|    |     | Null | B2 |
| B3 | AP3 | Null | C4,C5 |
|    | B3  | B1   | C1,B1,AP1 |
|    |     | B2   | C2,C3,B2,AP2 |
|    |     | Null | B3 |

| To DS | From DS | Address 1 | Address 2 | Address 3 | Address 4 |
|---|---|---|---|---|---|
| 0 | 0 | Destination | Source | BSSID | N/A |
| 0 | 1 | Destination | BSSID | Source | N/A |
| 1 | 0 | BSSID | Source | Destination | N/A |
| 1 | 1 | Receiver | Transmitter | Destination | Source |

FIGURE 8

| Router | Destination | Next Hop | Local Interface | Distance |
|---|---|---|---|---|
| B1 | B1 | NULL | B1 | 0 |
| | B2 | B2 | B1 | 1 |
| | B3 | B3 | B1 | 1 |
| | C5 | B3 | B1 | 2 |
| | AP1's subnet | NULL | AP1 | 0 |
| | AP2's subnet | B2 | B1 | 2 |
| | AP3's subnet | B3 | B1 | 2 |
| B2 | B1 | B1 | B2 | 1 |
| | B2 | NULL | B2 | 0 |
| | B3 | B3 | B2 | 1 |
| | C5 | B3 | B2 | 2 |
| | AP1's subnet | B1 | B2 | 2 |
| | AP2's subnet | NULL | AP2 | 0 |
| | AP3's subnet | B3 | B2 | 2 |
| B3 | B1 | B1 | B3 | 1 |
| | B2 | B2 | B3 | 1 |
| | B3 | NULL | B3 | 0 |
| | C5 | NULL | AP2 | 0 |
| | AP1's subnet | B1 | B3 | 2 |
| | AP2's subnet | B2 | B3 | 2 |
| | AP3's subnet | NULL | AP3 | 0 |

FIGURE 9

Routing Table 500

| Client MAC address | Client IP address | Previous AP IP address | Current AP IP address | Client Certificate |
|---|---|---|---|---|
| | | | | |

FIGURE 10

Contents of the Routing Update message 600

METHODS AND APPARATUS FOR SECURE, PORTABLE, WIRELESS AND MULTI-HOP DATA NETWORKING

CROSS-REFERENCE TO RELATED APPLICATIONS

This application is a continuation of and claims the benefit of U.S. patent application Ser. No. 12/053,414, filed Mar. 21, 2008, which is a divisional of and claims priority to U.S. patent application No. 10/463,857, filed Jun. 18, 2003, and Provisional application Ser. No. 60/428,700, filed Nov. 25, 2002, in the United States Patent and Trademark Office, the disclosures of all of which are incorporated herein by reference.

BACKGROUND OF THE INVENTION

1. Field of the Invention

The present invention is directed to data networking, and, more particularly, to secure, portable, and wireless data networking.

2. Description of the Related Art

In the current Wireless Local Area Network (WLAN) architecture, mobile clients connect wirelessly to Access Points (APs) to acquire connectivity to a backbone network to which the APs are attached. The backbone network is typically wired and is then connected to the rest of the organizational network. Among different WLAN communication standards, IEEE 802.11 ("Part 11: Wireless LAN Medium Access Control (MAC) and physical layer specifications", IEEE, 1999, and including all variations) is currently the most popular.

The WLAN architecture is ideal for network administrators who wish to wirelessly extend the boundary of their existing wired campus or corporate networks and to provide campus-wide mobility support. Under this architecture, mobile clients are no longer constrained by network cables and wall jacks as long as they maintain direct wireless contacts with some AP. Thanks to a number of dynamic configuration protocols such as the Dynamic Host Configuration Protocol (DHCP) (R. Droms, "Dynamic Host Configuration Protocol," RFC 2131, March 1997), mobile clients can easily join the WLAN with little or no user configuration effort. A user can move freely within the coverage area of the APs. When the user moves across the boundaries of the service areas of APs, WLAN and bridge protocols can update the link layer connectivity for the user so that on going communication sessions are not interrupted by the handoff and actual communication carrier (radio frequency) switch.

While mobile clients can enjoy the convenience of wireless network connectivity, on the other hand, it is not a trivial task to deploy a WLAN. APs need to be interconnected via a backbone network, typically a wired LAN. Therefore network cables must be installed to connect the APs to the existing network infrastructure. Electrical wires must also be in place to supply operating power to the APs. In addition, in order to determine the locations for the APs, WLAN planners need to predict wireless usage and conduct site surveys to determine the radio propagation characteristics. Operating channels also need to be allocated to each AP to keep the interference between neighboring communication cells to a minimum. After the deployment, it becomes another costly task to change the placement of the APs since the cables and wires need to be changed as well. If the usage pattern changes, oftentimes the WLAN is not able to be dynamically reconfigured to adapt to the changes.

Another problem with the existing IEEE 802.11 WLAN lies in its current security mechanism. In a WLAN, all transmitted bits are delivered over the air, which is an open communication medium to which anyone has access if he/she is within the radio signal range and has a radio device capable of receiving WLAN radio signals. Thus, encryption must be applied to sensitive data so that only the intended recipients can reconstruct and comprehend the data.

The IEEE 802.11 standard relies on the Wired Equivalency Privacy (WEP) protocol for its data protection. WEP uses a shared secret key of 40 bits (or 104 bits in a later version). A 24 bit Initial Vector (IV) is concatenated with the shared key to create a 64 bit (or 128 bit in the later standard) seed. The seed is then fed to a RC4 Pseudo Random Number Generator (PRNG) to generate a random bit sequence, which is used as the frame encryption key stream. The IV may be changed for every data frame encrypted so that the seed for the RC4 PRNG is different for every data frame. Thus, a different key stream is generated for encrypting each data frame. The IV is enclosed as clear text in each data frame so that the receiver may concatenate the received IV with the shared secret key to produce the RC4 PRNG seed and compute the decryption key stream. However, due to the limited IV size, there are only $2^{24}$, about 16 million, distinct key streams. Given the size of an average data frame and the transmission rate supported by IEEE 802.11, a busy AP may exhaust the distinct key stream space very quickly and be forced to reuse the encryption key stream. Since the IVs are enclosed as clear text in each data frame, it is relatively easy for an attacker to recognize a reused key stream. The attacker may collect pieces of cipher text that are encrypted with the same key stream and perform statistical analysis to attack and recover the plaintext. An attacker may also build up a dictionary of all possible key streams. In addition to vulnerabilities to these types of attacks, the security research community has also identified other weaknesses of the WEP protocol (N. Borisov, I. Goldberg, and D. Wagner, "Intercepting Mobile Communications: The Insecurity of 802.11", MOBICOM 2001, 2001).

The authentication scheme of IEEE 802.11 also has known problems that are related to the weaknesses in its encryption scheme. IEEE 802.11 APs provide two methods to protect against unauthorized accesses: Medium Access Control (MAC) address filtering and WEP-based shared-key authentication. A MAC address filter simply drops all data frames whose destination or source addresses are not listed in a pre-defined "allowed list". However, because MAC addresses can easily be sniffed and forged by any attacker, the MAC address filter offers little protection against unauthorized network accesses. The shared-key authentication process involves both parties (named initiator and responder) encrypting the same challenge using WEP with the same shared-key but different IVs. Since the shared-key authentication algorithm authorizes network access to those who have the shared-key, it would be effective only if unauthorized parties cannot recover the shared-key. However, with WEP being breakable, the shared-key authentication becomes only an illusion.

The IEEE's 802.1x (Port Based Network Access Control) standard ("Port-Based Network Access Control", IEEE, 2001) specifies an architectural framework that is designed to provide user authentication, network access control, and dynamic key management. Within the IEEE 802.1x framework, a system can use various specific authentication schemes and algorithms. The actual algorithm that is used to determine whether a user is authentic is left open and multiple algorithms are possible. After the exposure of the weaknesses in the IEEE 802.11 security mechanism, organizations have moved rapidly to adopt IEEE 802.1x as a solution for fixing the security problems in wireless LANs. The IEEE Robust Security Network (RSN) has also included the IEEE 802.1x standard as an important component (802.11i, IEEE 802.11 Task Group I, work in progress).

IEEE 802.1x is based on the PPP Extensible Authentication Protocol (EAP, L. Blunk and J. Vollbrecht, "PPP Extensible Authentication Protocol (EAP)", RFC 2284, March, 1998) for message exchange during the authentication process. EAP is built around the challenge-response communication paradigm that is common in network security solutions. Although originally designed as an authentication method for PPP connection, it can also be used for a wide range of LAN types such as Ethernet, token ring, or WLANs.

The following is a description of 802.1x-based authentication and dynamic encryption. FIG. 1 shows the components involved in IEEE 802.1x authentication operations. In a WLAN 100 with IEEE 802.1x, a client (also known as a supplicant) 102 requests access service to an AP (or an authenticator) 104. The AP 104 opens an unauthorized port for the client 102, which only accepts EAP messages from the supplicant (client) 102. Through this unauthorized port, the supplicant 102 exchanges EAP messages with the authenticator 104 and the authentication server 106, which is a back-end server executing the authentication algorithms. At the end of the authentication algorithm, the authentication server 106 returns an "accept" or "reject" instruction back to the authenticator 104. Upon receiving an "accept" message, the AP 104 opens the regular network access port for the client 102 to allow normal traffic for this client 102 to go through.

IEEE 802.1d MAC Bridge protocol ("Part 3: Media Access Control (MAC) Bridges", IEEE, 1998 (IEEE 802.1d); "Part 3: Media Access Control (MAC) Bridges—Amendment 2: Rapid Reconfiguration", IEEE, 2001 (IEEE 802.1w)) is known in the art.

IEEE 802.1d employs a spanning tree protocol, which is its method of forming a packet forwarding topology while preventing forwarding loops within a network of bridging devices. In an arbitrarily connected network, each bridge includes multiple ports. These ports are attached to a number of LAN segments. Among all bridges in a network, one bridge acts as the "root" of the spanning tree. It is the bridge with the highest priority bridge identifier (the priority identifier of a bridge is either derived from the unique ID of the bridge, which is typically the lowest MAC address among those of the bridge's ports, or configured by the network administrator).

In this protocol, each bridge uses each of its ports to report the following to its neighboring bridges: its own identity, the identity of the transmitting port, the identity of the bridge that the transmitting bridge believes to be the root, and the cost of the path from the transmitting port to the root bridge. Each bridge starts by assuming itself to be the root. If a bridge receives information that is "better" than what it currently has, it will re-compute its information based on the newly received information and then send out updated control messages to its neighboring bridges. What is considered "better information" includes information such as a bridge being a better root (with higher priority bridge identifier), a shorter path towards the root, lower cost routes, etc. Eventually through information propagation, all bridges learn the active spanning tree topology and configure their ports to forward data frames accordingly. On each bridge, the port that is the closest to the root is known as the "root port". On each LAN segment, the bridge that can provide the shortest path towards the root is known as the "designated bridge" for the LAN segment.

The IEEE 802.11 standard is known in the art.

SUMMARY OF THE INVENTION

It is an aspect of the present invention to provide a wireless network system that provides self-configured, portable, and secure wireless network access service to mobile users.

The above aspect can be attained by a self-configured, portable, dynamic, and secure network system formed by devices that provide self-configured, portable, and secure wireless network access service to mobile users and is referred to as the Secure Nomadic Wireless Network (SNOWNET). Such devices are referred to as SNOWNET nodes.

That is, the present invention provides methods and apparatus for secure, portable, wireless, and multi-hop data networking, referred to as the secure nomadic wireless network (SNOWNET).

Primarily, a SNOWNET can be quickly deployed in any area, regardless of existing communication and power infrastructure, to provide secure network connectivity to authenticated mobile clients. Specifically, the installation process can be reduced to the placing of SNOWNET nodes in the field of operation, powering them up, and optionally orienting the external antenna attached to these nodes to connect to other SNOWNET nodes. Any configuration parameters, such as the identity of neighboring devices, address assignments and message routes, will be determined autonomously by the collaborative operations of a set of such SNOWNET nodes. The communications between SNOWNET nodes as well as between SNOWNET nodes and mobile clients will be secure. Only authorized devices (both SNOWNET nodes and mobile clients) are allowed to access and be served by the SNOWNET.

In response to the need for secure and portable wireless data networking, the Secure Nomadic Wireless Network (SNOWNET) of the present invention is provided. The Secure Nomadic Wireless Network (SNOWNET) is a hierarchical network with a dynamic wireless backbone network interconnecting a number of local access service areas. SNOWNET nodes are used to form the backbone network as well as provide local access services.

SNOWNET provides security through authentication of the nodes and clients, as well as through encryption of the data.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 7 is a diagram of a SNOWNET Bridging Table contents.

FIG. 8 is a diagram of IEEE 802.11 Data Frame Address Field Contents.

FIG. 9 is a diagram of a SNOWNET Routing Table contents.

FIG. 10 is a diagram of Routing Update Message Contents.

DETAILED DESCRIPTION OF THE PREFERRED EMBODIMENTS

The architecture of the SNOWNET, the functions and design of SNOWNET nodes, and the protocols executed by SNOWNET nodes, of the present invention are now disclosed, with reference to FIGS. 2-10.

Figure 1:
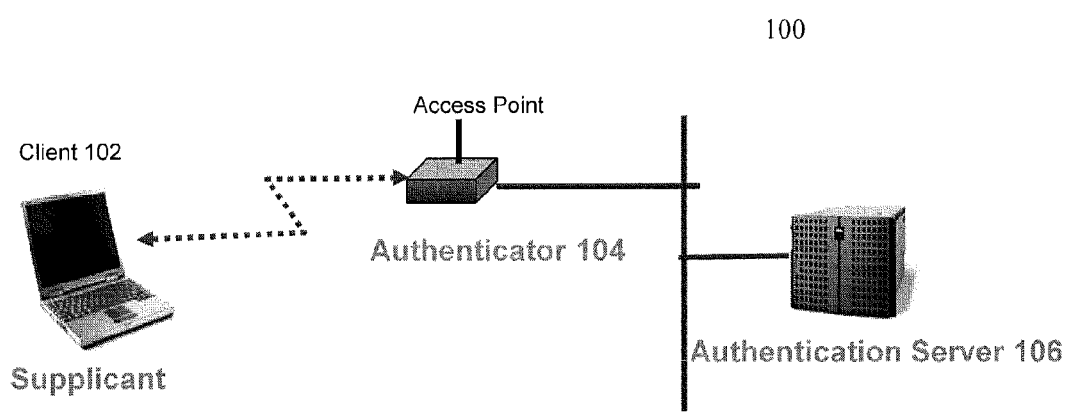
FIG. 1 is a diagram of a wireless local area network (LAN) with IEEE 802.1x.
Figure 2:
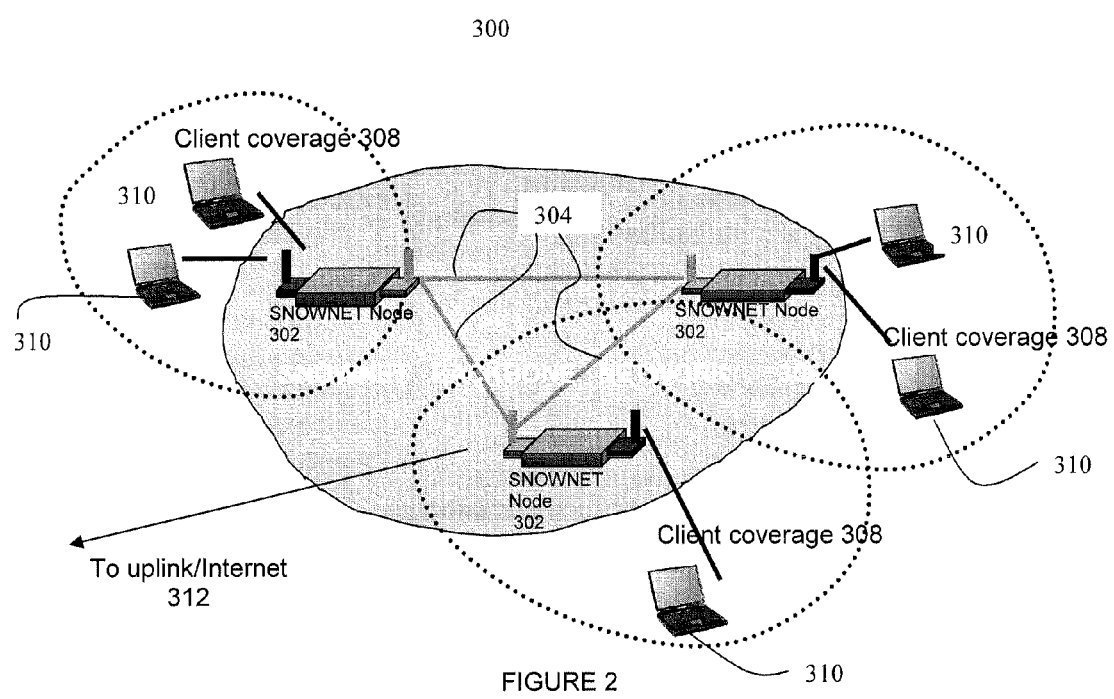
FIG. 2 is a diagram of the system architecture of the present invention.

FIG. 2 illustrates the architecture of a SNOWNET system network 300 of the present invention. Each SNOWNET node 302 is equipped with at least one wireless network interface, which is used for communications between peer SNOWNET nodes 302. Links 304 are formed between SNOWNET nodes 302 dynamically if wireless communication can be established between them. The network including only the SNOWNET nodes 302 and the links 304 between them are referred to as the SNOWNET backbone network 306. The interface dedicated by each SNOWNET node 302 for backbone communication is referred to as the backbone interface. Optional external antennas may also be used to extend the communication range of the backbone interfaces.

As shown in FIG. 2, each SNOWNET node 302 also provides client coverage 308 for clients 310 within its coverage area that are equipped with a client wireless device. This is referred to as the SNOWNET node 302 providing Local Access Service for the clients 310 in its coverage area. It is also possible for a SNOWNET node 302 to provide wired local access service to clients with a wired communication interface via a wired Local Area Network (LAN connected to a wired communication interface of the SNOWNET node 302. This traffic would then be forwarded on the wireless backbone network, thus wirelessly connecting two wired networks.

There are many ways to organize the SNOWNET backbone network 306. The most flexible is to configure the communication technology used by the backbone interfaces of the SNOWNET 300 to run under peer-to-peer mode. In the case of using IEEE 802.11 network interfaces as the backbone interfaces, the interfaces should run in 802.11 Ad Hoc mode. There are also special cases providing different backbone network 306 configurations. For instance if the backbone network 306 forms a "star" topology, the backbone interface of the center node is configured as an access point (AP) and the other nodes as clients.

It is not necessary for all links 304 of the backbone network 306 to use the same link technology. Nodes with backbone interfaces of the same technology may form sub-backbones. Sub-backbones are connected together to form the overall backbone network 306 by nodes 302 with multiple backbone interfaces of different technologies that are simultaneously residing on multiple sub-backbones.

In addition to backbone interface(s), a SNOWNET node 302 is typically equipped with additional interfaces to provide local network access services to mobile clients 310. In FIG. 2, all three SNOWNET nodes 302 have dual wireless interfaces, one for backbone communications, and the other for providing local access services. The local service interface can be of any LAN technology such as an IEEE 802.3 network interface, an IEEE 802.11 interface running in AP mode, Bluetooth, etc.

Some SNOWNET nodes may also have an additional link 312 connected to the rest of an organizational network, the global Internet or some other external network. These nodes, called SNOWNET gateways act as gateways for the SNOWNET 300 to reach the Internet or other external networks. These links may be of various link technologies, e.g. an Ethernet cable connected to a LAN for a fixed-group network, a wireless LAN interface to an AP, a Point-to-Point Protocol (PPP) connection, or a 3G wide-area wireless communication interface, etc.

Some interfaces of the SNOWNET node 302 may even be virtual interfaces. For instance, a physical interface may be multiplexed or time-shared to create multiple virtual interfaces that can be used for different purposes. For example, the SNOWNET node 302 of the present invention allows algorithms to be built so that the same IEEE 802.11 interface may run in ad hoc mode in some time slots to act as the backbone interface and in AP mode in other time slots to act as the local access service interface. Moreover, a SNOWNET node may dynamically change one of its AP interfaces to a backbone interface or vice versa.

Communications in a SNOWNET 300 are organized into two levels: backbone communication and local access communication. SNOWNET nodes 302 relay communication between these two levels. Therefore a typical intra-SNOWNET communication path between two clients receiving local service from different SNOWNET nodes 302 may include the link between the source mobile client 310 and the SNOWNET node 302 serving the source client 310, a number of SNOWNET backbone links, and finally the link between the destination client 310 and its access service SNOWNET node 302. If the destination is on another external network, then the communication path would include the SNOWNET gateway node that is forwarding traffic for that network.

Figure 3:
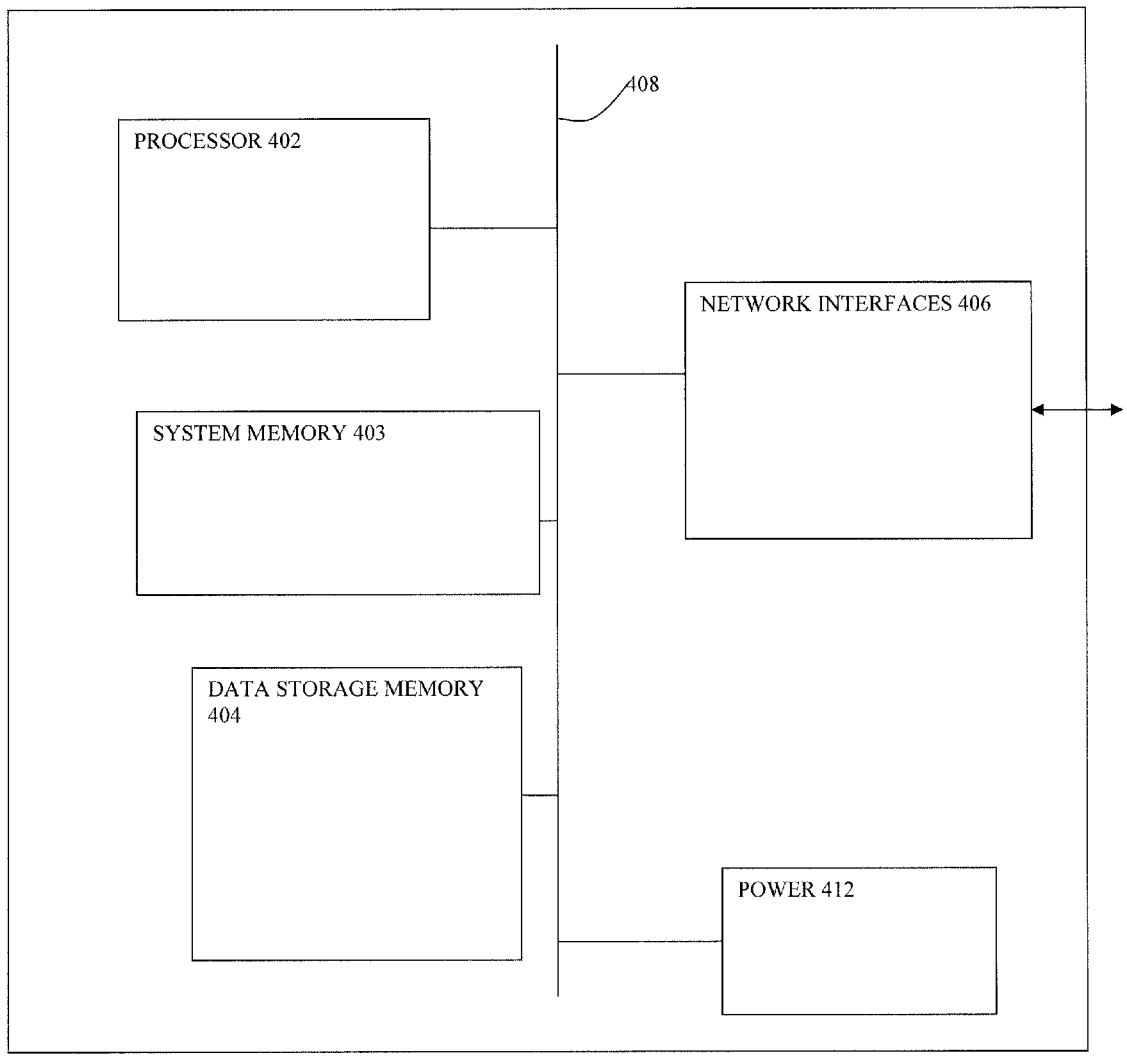
FIG. 3 shows a diagram of the hardware architecture of a SNOWNET node 302 of the present invention.

SNOWNET Node 302 hardware is now disclosed. FIG. 3 shows a diagram of the hardware architecture of a SNOWNET node 302 of the present invention.

Each SNOWNET node 302 can be implemented as an embedded system comprising a processor 402, system memory (RAM) 403, data storage memory (Flash) 404 for software and security related data such as certificates and keys, one or more network interfaces 406, and a system bus 408 connecting these components. Each node 302 has a manageable and portable form factor as well as protective casing. Optionally, each node 302 may be equipped with external antennas 410 to extend the communication ranges of its wireless network interfaces 406. These network interfaces 406 provide local wired or wireless access, wireless backbone access, or wired or wireless gateway access.

A SNOWNET node 302 configuration depends on its specific intended use in the network. The typical SNOWNET node 302 in a remote location would have two wireless interfaces 406: one for a backbone and one for local access service. A SNOWNET gateway node 302 may have these two wireless network interfaces plus a third network interface 406, such as a wired Ethernet interface to connect to the external network.

Since a SNOWNET node 302 is portable, a SNOWNET node 302 uses DC power that can be supplied by batteries as the main power source 412. DC power can be provided from AC converters from the electric outlet, battery charging devices, solar energy devices, automobile battery outlets, or other power generating devices.

In certain operational scenarios when a battery is the only possible energy source, it is important for the collaborative network 300 formed by these nodes 302 to be both power-efficient and power-aware. SNOWNET nodes 302 implement power management procedures to preserve battery power when possible.

The file system 404 on a SNOWNET node 302 is an encrypted file system. All information stored in data storage 404 is encrypted. When the node 302 is booted up, the operator provides a decryption key supplier (i.e. a Smartcard, a USB key, etc). The boot up sequence of the node 302 locates and loads the decryption key from the supplier. Only then can the file system 404 be accessed. Critical operational system files are decrypted and loaded into system memory 403 to be executed. When a node 302 is disconnected from the authentication and key management server of the SNOWNET (the SNOWNET authentication server as detailed later), i.e. not receiving key management messages from the server, for a certain period of time, an automatic power shut down is performed. Other tampering with the SNOWNET node 302 is prevented by physical security methods on the node 302.

The above-mentioned feature of the present invention reduces the risk to the whole SNOWNET 300 if one SNOWNET node 302 is compromised by an unauthorized user. Without a valid connection to the decryption key supplier, the SNOWNET node 302 is inoperable after it has been powered down unless a valid decryption key supplier is applied. Even in the case that the attacker maintains a power supply to the SNOWNET node 302, the node 302 will be isolated from the other SNOWNET node population 300 using this timeout mechanism.

Figure 4:
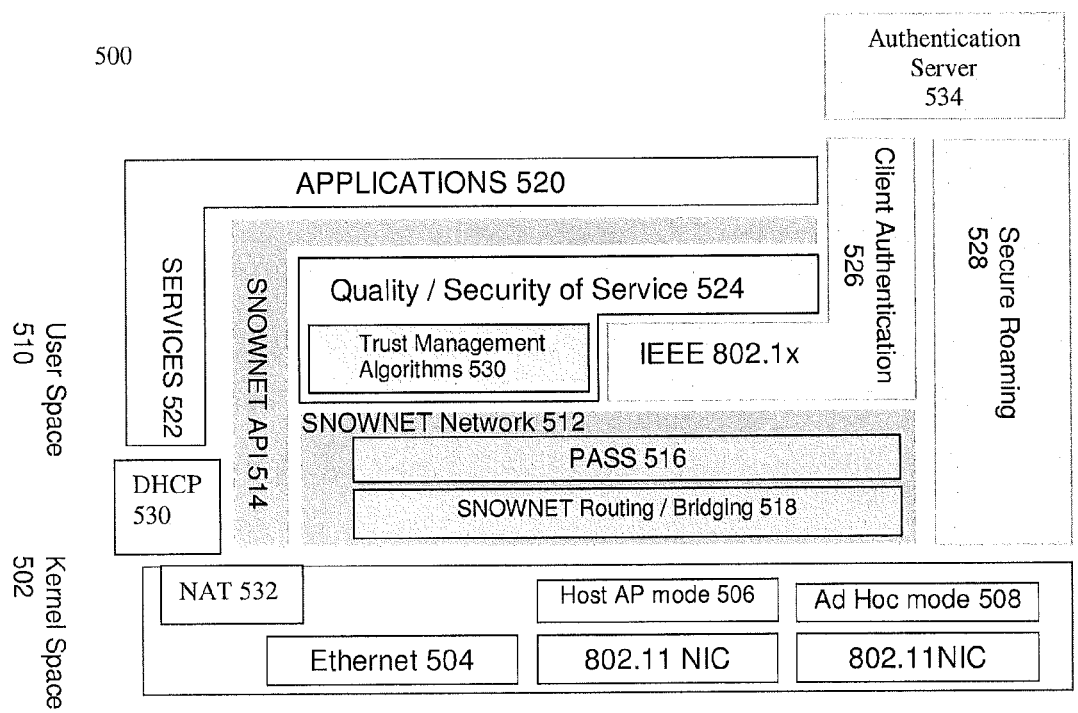
FIG. 4 is a diagram of the software components of a node of the present invention.

FIG. 4 is a diagram showing the SNOWNET node 302 software architecture components 500. The SNOWNET node 302 software components 500 are stored in the data storage memory 404 of each SNOWNET node 302.

The software components 500 include operating system kernel space drivers 502 for various network interfaces, including drivers for Ethernet 504, 802.11 Network Interface Card (NIC) in Host AP mode 506, and 802.11 NIC in Ad Hoc mode 508. All other SNOWNET components reside in user space 510, or in kernel space 502 to improve performance. In particular, a Network Address Translation (NAT) module 532 resides in kernel space to provide the translation between external Internet addresses and the internal SNOWNET address space.

There are two major SNOWNET modules, a SNOWNET network layer 512 and a SNOWNET API 514. Within the SNOWNET network layer 512, the functions of SNOWNET node authentication 516 and SNOWNET Routing/Bridging 518 are implemented. For SNOWNET nodes providing client device access service, a standard DHCP module is included to dynamically assign addresses to clients. The SNOWNET Application Programmers Interface (API) 514 offers an application development interface so that other applications 520 and services 522 can access lower-level, SNOWNET specific features such as Routing Table information (shown in FIG. 9). Examples of applications that could be implemented in a SNOWNET network 300 include Wireless Voice, streaming data and many other network functions. In an embodiment, the API is defined and implemented for the Network Layer 512 and the Client Authentication Module 526 and includes program calls in the C language.

The SNOWNET network layer 512 is implemented as a network service to the other middleware components of a SNOWNET node 302. These optional SNOWNET middleware components may include Quality of Service module 524, the Security of Service module 524, trust management algorithms 530 and client authentication module 526. The Quality of Service module 524 controls the share of the communication bandwidth given to each client. The Security of service 524 provides levels of additional security depending on the needs of the client. The trust management algorithms deal with rules for initial bootstrapping of the system and for allowing unknown clients and routers to become part of the system. The client authentication module 526 implements the 802.1x policy for admitting and identifying clients and is discussed further below.

Each SNOWNET node 302 also includes a module supporting secure roaming for clients 528. This is the module 528 that transfers the "trust and credentials" of a client from one SNOWNET node 302 to another when the client 310 moves from one SNOWNET node's local service area to another node's local service area. With the help of this module 528, the client 310 does not need to go through the entire authentication phase again in the new local service area. Thus the time gap between the client 310 being served by two SNOWNET nodes is relatively smaller and the handoff is relatively smoother.

A SNOWNET node 302 may optionally host an authentication server 534 such as a RADIUS server 303 that will provide all of the necessary checking of credentials, generation of keys and storage of credential information.

Security features of the SNOWNET of the present invention, including SNOWNET implementation of IEEE 802.1x, PASS for SNOWNET, and authentication and security during handoff, are now discussed.

Figure 5:
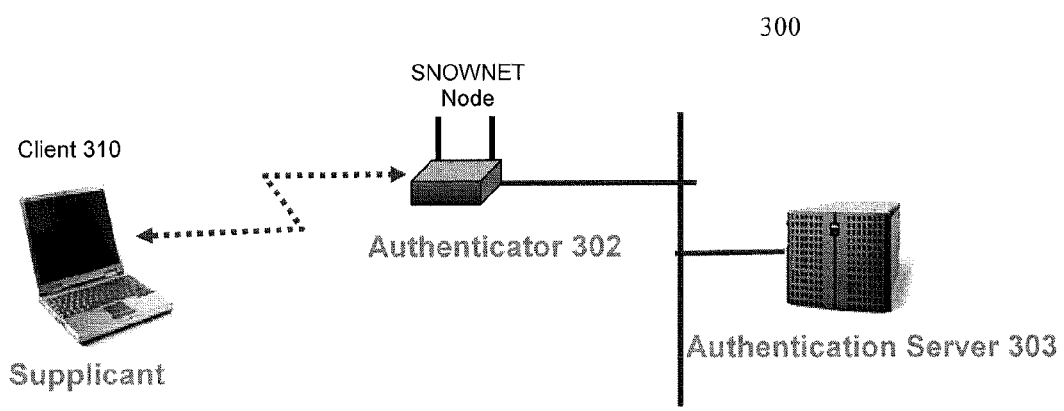
FIG. 5 is a diagram of SNOWNET implementation of IEEE 802.1x.

The present SNOWNET implementation of IEEE 802.1x features is now discussed, with reference to FIG. 5.

As shown in FIG. 5, a supplicant (or client) 310 accesses the SNOWNET 300 through the access point interface of the SNOWNET node 302. The SNOWNET node 302 serves as an authenticator, and is in communication with an Authentication Server 303.

If the network environment of the SNOWNET 300 permits connectivity to a RADIUS server (C. Rigney, A. Rubens, W. Simpson, and S. Willens, "Remote Authentication Dial In USER SERVICES (RADIUS)", RFC 2138, April, 1997), SNOWNET 300 uses an existing organizational RADIUS server as the backend authentication server 303. Otherwise, one SNOWNET node 302 can be configured as an authentication server 303 by running the RADIUS server software. Before SNOWNET deployment, this node 303 downloads all necessary certificates into its system memory 404 so it can carry out the authentication duties. Such certificates include those for SNOWNET nodes 302 as well as for all authorized clients. Additional hardware resources such as system memory and a higher-performance CPU may be installed on an authorization server node 303 to improve performance. During deployment, the RADIUS server node 303 must be activated before any other SNOWNET nodes 302 are turned on and remain active until all other SNOWNET nodes 302 are turned off.

SNOWNET nodes 302 that provide local network access services act as authenticators in the IEEE 802.1x architecture using its Client Authentication Module 526. Regular mobile clients 310 are supplicants. SNOWNET is compatible with many existing off-the-shelf implementations of supplicant functionality, e.g. Windows XP, Xsupplicant, etc. To execute the authenticator functions, the Client Authentication Module 526 in SNOWNET nodes 302 run the Open1X Authenticator software, an open source implementation of the IEEE 802.1x authenticator (Open1x, on the world wide web at open1x.org) 526. SNOWNET Client Authentication Modules 526 enhance the standard IEEE 802.1x security by offering additional features such as mutual authentication between the mobile clients and the network and dynamic key rotation. Mutual authentication between mobile clients 310 and the SNOWNET network 300 is supported through the successful completion of the authentication process, as this can only be accomplished if both the client 310 and SNOWNET nodes 302 are properly identified using a public key infrastructure. Dynamic keys in which the security encryption keys are changed periodically and redistributed through the SNOWNET network 300 is one of the features supported by SNOWNET 300.

The details of the Client and Network Mutual Authentication procedure in SNOWNET 300 are as follows. During the EAP handshake between the mobile client 310 and authenticating SNOWNET node 302, the client 310 sends an EAP start message and the SNOWNET node 302 returns an EAP message requesting the user's identity. The client 310 returns his certificate encrypted using a public key encryption mechanism with the authentication server's 303 public key. The authenticator 302 then forwards this encrypted certificate to the authentication server 303. The authentication server 303 verifies the client certificate and if the certificate is valid, the authentication server 303 generates a session key for the client and sends the session key to both the client 310 and authenticator 303. Using this session key, the AP 302 encrypts the local shared WEP key and sends the encrypted shared key to the client 310. To support mutual authentication, the authentication server 303 also encrypts the certificate for the whole SNOWNET 300 using the client's 310 public key and sends the encrypted certificate to the client 310 so the client 310 can authenticate the network 300 as well. If the client 310 accepts the network certificate, the client 310 decrypts the local shared WEP key, configures the shared key into its IEEE 802.11 device, and begins to access the network 300.

Using the same RADIUS server 303, SNOWNET 300 dynamically and periodically updates the shared keys used for communications between clients 310 and APs 302. SNOWNET 300 does not need to update the shared keys when a client 310 disconnects from the network 300 because the shared key used at that moment will soon be replaced by periodical key refreshing.

PASS for SNOWNET is now explained.

In the previous section the focus has been on how authorization and encryption key management are done between mobile clients (supplicants) 310 and authenticators 302. In this section the topic is authorization and key management among the SNOWNET nodes 302 themselves.

PASS refers to the Propagative Authentication Scheme for SNOWNET, which is explained herein below.

When IEEE 802.1x is adopted for typical 802.11 WLANs, there is an implicit assumption of an existing wired infrastructure (including access points and network cables interconnecting the access points) in which the topology of the network between the access points (APs) is static and the APs are trusted entities. Hence, there is a clear separation between the roles of supplicants (mobile clients) and authenticators (APs) and there is no need to raise the issue of the authenticity of the APs because they are already installed and connected via relatively secure wired connections.

In SNOWNET 300, the backbone network 306 is wireless and dynamic, permitting new SNOWNET nodes 302 to join and others to leave the backbone network 306 during normal operation. Before these new nodes 302 can provide network access and authentication services to regular mobile clients 310, the nodes 302 first need to be admitted to the backbone network 306. In other words, SNOWNET nodes 302 themselves must also be authenticated within the SNOWNET 300. This new authentication scheme is referred to as the "Propagative Authentication Scheme for SNOWNET" or PASS and is implemented in the PASS module 516.

One feature of PASS is in the double role played by each SNOWNET node 302. Prior to becoming part of the SNOWNET backbone network 306, a SNOWNET node 302 acts as a supplicant in the IEEE 802.1x framework. The SNOWNET node 302 includes all necessary software to be a supplicant in the PASS module 516, i.e. Xsupplicant for Linux/BSD implementation of SNOWNET nodes 302. The SNOWNET node 302 follows the same procedure as would any mobile client supplicant in order to pass the mutual authentication phase between itself and the existing SNOWNET 300. After a successful authentication, the new SNOWNET node 302 is given the shared communication key of the backbone network 306 so the SNOWNET node can participant in backbone communications.

Only after being admitted to the backbone network 306 may the new SNOWNET node 302 begin to offer network access services to its local clients 310. Before the new SNOWNET node 302 can proceed further, the new SNOWNET node 302 first needs to become an authenticator by starting the execution of its Client Authentication Module 526 with the authenticator software. During normal operation, each SNOWNET node 302 is responsible for authenticating both local mobile clients 310 and new SNOWNET nodes 302. Thus, the secure and authenticated backbone 306 is built up in an incremental and propagative fashion using the RADIUS server node 303; hence the procedure is termed the Propagative Authentication Scheme for SNOWNET (PASS).

All authenticated SNOWNET nodes use the same key for encrypting backbone communication. This shared key is periodically changed in the same fashion as the client-to-AP session key. The RADIUS server 303 manages the shared key used for backbone communication separately from the keys for mobile clients 310.

Authentication and Security During Handoff is now explained.

When a mobile client 310 moves from the service area of one SNOWNET node 302 to that of another SNOWNET node 302, several tasks are performed to ensure the mobile client 310 receives uninterrupted data traffic.

Generally when roaming in an 802.11 WLAN, the first event to occur is a link layer handoff. That is, upon some predefined triggering event, the communication link between the mobile client and its current AP is broken and a new communication link between the mobile client and a new AP is established. Then the system performs the network layer handoff. That is, the mobile client establishes its new topological attachment (to its new AP) and propagates the information to the whole network so that data traffic from/to the mobile client can be properly directed. In this section, the issues related to authentication and security during link layer handoff are addressed. In the following section, network layer handoff is discussed.

The details of the link layer handoff operations vary depending on the link layer technology. In the case of current IEEE 802.11 WLAN technology, link layer handoff is done in a "break-before-make" fashion. When a mobile client discovers that the quality of the signal from its current AP drops below a predefined threshold, the mobile client will try to find a new AP with better signal quality. Optionally the mobile client may send out a disassociation message to its current AP to notify the current AP of the departure so that the AP can remove any states stored for the mobile client. Then the mobile client performs a scan over all channels to determine available APs and their characteristics and the selects its new target AP.

After the new AP is selected, the 802.11 standard specifies an authentication procedure for the mobile client by the new AP. However, as discussed herein above, the shared-key authentication scheme of 802.11 is not effective. On the other hand, many deployed 802.11 systems are open systems in which any mobile client is authenticated by default.

After authentication, the mobile client tries to connect to the new AP by sending to the new AP an Association Request. Upon the receipt of an Association Request, the AP sends back an Association Response. If the request is accepted, this response contains a "successful" value. After receiving an Association Response with "successful", the mobile client acknowledges the message. Then the new connection is established and the mobile client can send and receive via the new AP.

Similarly, in SNOWNET 300 when a mobile client 310 roams from one SNOWNET node's 302 access service area to that of another, the mobile client 310 executes the functions of scan, authentication, and association.

SNOWNET 300 employs an optimized scan scheme to reduce the time needed to complete a scan. The reason for a mobile client 310 to perform a scan over all channels is that the client 310 does not know which SNOWNET nodes 302 are available in the area of the mobile client 310. Putting the network interface of the mobile client 310 into promiscuous mode does not solve the problem because the SNOWNET nodes 302 may operate on different channels than the client's 310 current channel and thus still can not be heard. In SNOWNET 300, the clients 310 may perform scan operations even during normal operation to constantly monitor the availability of nearby SNOWNET nodes 302 and their characteristics. This monitoring scan is only done under the condition of not interrupting ongoing communication and is not performed when battery lifetime becomes a concern. With such a list of recently heard nearby SNOWNET nodes 302, when a handoff is needed, the mobile client 310 may focus only on those SNOWNET nodes 302 that are on the "recently heard" list and have good signal quality. Thus, the need for a full channel scan is avoided and the time the mobile client 310 takes to select its new service node 302 is reduced. In cases when the "recently heard" list is created very recently, the mobile client 310 may immediately select its new service node directly from the list without additional scanning.

The association procedure in SNOWNET 300 is similar to what the current 802.11 standard specifies and thus is not discussed here. The focus of this section is on authentication and security with respect to roaming.

Authentication is a lengthy process which requires both communication and processing resources. Thus, it is desirable that authentication will not be performed during handoff. The present invention includes an authentication and security handoff mechanism that smoothly and securely relocates the mobile client 310 to its new access service area with minimal delay. The mechanism is based on a public key system. It is assumed that all SNOWNET nodes 302 have a pair of keys, one public and one private. Each SNOWNET node 302 is aware of the public keys of other neighboring SNOWNET nodes 302. Each mobile client 310 also knows the public keys of the nearby SNOWNET nodes 302. This feature is fulfilled by either pre-installation or an external public key exchanging protocol.

When such an authentication and security handoff service is needed, a mobile client 310 needs to request that its current SNOWNET service node 302 provide a ticket. This ticket includes information such as the mobile client's identity and its current access service SNOWNET node's identity. The ticket includes other fields such as the time when the ticket is issued, its expiration time, a session key transmission key, check sum, etc. The ticket may also include some random bit padding before and after the real fields. This ticket is encrypted by the SNOWNET node 302 using its private key. This encrypted ticket is then sent to the requesting mobile client 310. Because the delivery of this ticket is over an established secure communication session between the mobile client 310 and its current SNOWNET service node 302, such a delivery is secure.

Optionally, if the mobile client 310 supports public key cryptography and has the computing resources to decrypt a message encrypted using asymmetric cryptography, the SNOWNET node 302 may encrypt the already encrypted ticket (with the SNOWNET node's private key) again with the mobile client's public key. Upon receiving such a double encrypted ticket; the mobile client 310 decrypts the ticket using the mobile client's private key and stores the ticket (still encrypted with the service node's public key). This way, even if such a ticket is captured by a third party; the third party can not decrypt the ticket.

After the mobile client 310 selects its new SNOWNET service node 302, the mobile client 310 sends to the new SNOWNET node 302 a re-authenticate request message. This message includes its own identity, the identity of its previous service node, and the stored ticket. The message is encrypted using the new service node's public key.

Upon receiving such a re-authentication message, the new service node 302 first decrypts the message using its own private key. Then the new service node 302 decrypts the ticket (still encrypted with the previous service node's private key) included inside of the message using the public key of the previous service node. If the ticket is valid, the service node 302 generates a temporary communication session key for the mobile client 310. The service node 302 sends back to the client 310 a re-authentication response message with a "successful" flag. The message is encrypted with the session key transmission key included in the ticket and sent to the mobile client 310 over the open channel. After receiving the temporary communication session key, the mobile client 310 may send and receive message traffic via the new service node 302.

The temporary communication session key is only valid for a short period of time. After the temporary communication session key is expired, use of the temporary communication session key is not permitted for communication between the mobile client 310 and its new service node 302. Thus, during the valid window of this temporary communication session key, the mobile client 310 must complete the normal mobile client authentication procedure as described earlier in this section. That is, the mobile client's credential needs to be transmitted to the RADIUS server 303 of the SNOWNET 300 for the client 302 to be authenticated. After being authenticated by the RADIUS server 303, the RADIUS server 303 will start to issue and manage session keys for the communication between the mobile client 310 and service node 302 in the normal fashion.

SNOWNET Addressing

Before how data is forwarded within SNOWNET is explained, how addresses are managed is first described in more detail.

SNOWNET nodes may have multiple communication interfaces, each having a globally unique identifier known as the hardware address of the interface. Such an address is used in link layer communication between communication interfaces for the interfaces to address each other. Since link layer communication is typically handled by Medium Access Control (MAC) protocols, the hardware addresses are also typically known as MAC addresses. Among various addressing standards, the IEEE 802.3 (Ethernet) standard is the most widely accepted. Almost all newer MAC protocol standards adopt the same 48-bit address format. Because MAC addresses are assigned to communication interface hardware by the manufacturers and they are globally unique, they are also commonly used as unique identifiers of their hosting devices. For SNOWNET nodes with more than one communication interface, and thus multiple MAC addresses, the lowest MAC address is used as the unique node identifier of the SNOWNET node.

Although MAC addresses are globally unique, they are managed by and organized according to hardware manufacturers. In order for computing devices to communicate with each other on a global scale, a more hierarchically structured addressing scheme based on the attachment location of the device, not the manufacturer of the device, is typically employed. Thus each communication interface is also assigned a network layer address known as the Internet Protocol (IP) address. Each IP address identifies a globally addressable communication end point on the Internet. Each IP address has a network address portion and a host address portion. These network addresses are also managed hierarchically. That is, a network may be divided into sub-networks and sub-networks may be further divided into smaller sub-networks. The global routing architecture is also hierarchical. At the highest level, routers only have routing entries for large, autonomously administrated networks, i.e. the network of a single Internet Service Provider (ISP). At a lower level, for instance, the routers within an autonomously administrated network would have routing entries for sub-networks within this network.

Network addresses are specified by a number and a length. The length specifies how many bits (from the most significant bit) are used for the network address within an IP address. The rest of the bits of the IP address can be used to address other entities within the network. These addresses together are known as the address space of the network (or sub-network). Hence, the shorter a network address is, the larger the network can be, and the larger the address space of the network is.

The smallest sub-network is also known as a "broadcast domain" because only at this level is the broadcast MAC address FF:FF:FF:FF:FF:FF effective. A device may use this broadcast address to communicate with all devices within the broadcast domain. As mentioned before, an IP address needs to be mapped to MAC address for carrying out link layer communication. The mapping between an IP address and a MAC address is also only known within broadcast domains because only within the same broadcast domain may devices use the broadcast MAC address to query each other for the mapping between IP address and MAC address. From an IP forwarding point of view, all devices within the same broadcast domain are only one hop away from each other.

As discussed in greater detail later, SNOWNET may operate in two different data forwarding modes: bridging mode and routing mode. The address management is done differently in these two modes.

When SNOWNET operates in bridging mode, its IP address management is very simple. The whole SNOWNET is a single broadcast domain. All devices including both SNOWNET devices and client devices share the same IP address space. A special SNOWNET node is configured as a DHCP server and manages IP address assignment for the whole network. It has a pool of addresses for it to lease to clients and SNOWNET node devices. IP addresses of expired leases are returned to the address pool for future assignments. After a new device, either a SNOWNET node or a client device, is authenticated, it will issue a DHCP request asking for an IP address assignment and other related IP communication parameters such as the addresses of the default routers for the SNOWNET and Domain Name Servers (DNS). This request is broadcast to all devices in the SNOWNET, including the DHCP server node. All other nodes will ignore the request except the DHCP server node, which will reply to the request with an IP address allocated from its IP address pool. Other requested parameters are also included in the reply message. The reply is sent back to the new device and the new device may use the assigned IP address and other parameters to configure itself.

When SNOWNET operates in routing mode, the address management is more complicated. Addresses can not be managed by a single entity for the whole SNOWNET since the SNOWNET may be divided into multiple sub-networks. The typical configuration is that each SNOWNET node providing local access services will have its own sub-networks and manage the addressing within these sub-networks. A separate sub-network address space is allocated for the backbone interfaces of the SNOWNET nodes. The administrator of a routing mode SNOWNET needs to configure the address space of this separate backbone sub-network.

After a new SNOWNET node is accepted into the network, addresses need to be assigned to the new node. These addresses include address(es) for the node's backbone interface and the address spaces for its service interfaces. This is accomplished by the SNOWNET in a distributed fashion. The new node will send an Address Request to the SNOWNET node acting as its authenticator asking for addresses for its backbone interfaces and address spaces for its local service interfaces. By consulting its routing table for known addresses and address spaces of the SNOWNET, the authenticator node assigns unused addresses and address spaces to the new node and sends these assignments back to the requesting node.

Because of the distributed nature of the problem, the above address assignment may still conflict with other nodes within the SNOWNET. This is either because of the imperfect knowledge of the authenticator about address usage in the whole network or because there are other new nodes at a distant portion of the same SNOWNET requesting addresses from a different authenticator node at the same time. If such a conflict does occur and is detected later, it is resolved based on the identifier of the nodes involved. The SNOWNET node with lower node identifier is able to keep its addresses and the other party needs to relinquish its addresses and go through the address request and selection procedure again.

Due to the shortage of IP addresses, a common practice is for an administrator to use "private addresses" for computers within the network under his management. These addresses are IP address in the same format as any other addresses. However, they can only be used within a private network to address devices within the same private network. Such addresses can not be used outside of private networks. Hence, devices with private addresses are not really "globally addressable".

Devices in private networks can not use their private addresses to communicate with device outside of their private network. Different private networks may also use the same private network address spaces as well since devices will not use their private addresses to communicate with devices in different private networks.

solution to this problem is know as Network Address Translation (NAT), that is, the nodes connecting to both a private network and the Internet needs to perform network address translations for communications between a device inside of the private network and a device outside of the private network. A NAT device has one interface connected to the private network with a private address so it can communicate with device within the same private network. The same NAT device also has one interface connected to the Internet with a public address so it can communicate with other devices on the Internet.

All application layer communication endpoints are identified by a network layer address (IP address) and a transport layer address (User Datagram Protocol port or Transmission Control Protocol port). When a data packet is sent from a private address device, it is forwarded to the NAT device first. The NAT device stores the source node's network layer address and transport layer address in a translation entry of its NAT table. The NAT device allocates an unused port of the same transport layer protocol as the source uses from itself for this data packet and stores the port number in the table with the source device's private address and port number. It then replaces the data packet's source network layer address and transport layer address with its own public IP address and the newly allocated port. The data packet is then forwarded out of its public network interface.

To the other end of the communication, it would appear that the communication is originated from the NAT device so the return communication is also address to the NAT device using the NAT device's public address and network layer address and the transport layer address as destination addresses. After the in-bound data packet reaches the NAT device, the device uses the destination transport layer address to locate the translation entry and find out the private IP address and transport layer address in that entry. The NAT device again replaces the destination network layer address and transport layer address of the packet with the ones stored in the translation entry and forwards the packet out of its private network interface to reach the real communication end point.

The SNOWNET addressing schemes introduced above work with both private addresses and public addresses so the administrator of the SNOWNET may select either method, depending on how many IP addresses are available to allocate for the SNOWNET. If private addresses are used for the SNOWNET, the gateway SNOWNET nodes need to provide NAT functionality.

Data Forwarding

SNOWNET 300 data forwarding, including bridging and routing, is now disclosed.

SNOWNET 300 provides two separate levels of security by using independent shared WEP key management procedures for the backbone communications and the communications between a SNOWNET node 302 and its mobile clients 310.

Data packets originating from a source client 310 are encrypted using the local encryption key generated from the shared key of the SNOWNET node 302 serving this client 310. The packet is received on the AP interface and decrypted by the SNOWNET node 302. Then if the packet is to be sent on the backbone 306, the packet is then encrypted again by the SNOWNET node 302 with the encryption key generated from the shared backbone WEP key.

SNOWNET nodes 302 may operate in one of two data forwarding modes: bridging mode and routing mode. Each mode is disclosed herein below.

Bridging Mode

When SNOWNET nodes 302 operate in bridging mode, the SNOWNET nodes 302 execute the IEEE 802.1d MAC Bridge protocol, discussed herein above. SNOWNET nodes 302 may be referred to as "SNOWNET bridges" 305 when the SNOWNET nodes 302 are operating in bridging mode.

SNOWNET bridges 305 execute a spanning tree protocol to configure their forwarding topology within the backbone network 306. The spanning tree protocol for SNOWNET bridges 305 incorporate the IEEE 802.1d protocol, modified such that SNOWNET Bridge ports are a mix of physical and virtual entities. The local service access network interfaces of SNOWNET bridges are considered as physical ports by SNOWNET bridges 305. On the other hand, backbone "ports" are virtual and there is one port assigned for each backbone network link. That is, each virtual port is identified by the pair-wise combination of local backbone interface identity and the backbone interface identity on a neighboring bridge. In an embodiment, the communication between a bridge and all its neighboring bridges may share the same physical interface, as occurs in a broadcast link. All ports, virtual or physical, are identified before SNOWNET nodes 302 start the spanning tree protocol. During normal operation, the status of active ports is monitored constantly by a combination of passive traffic listening and active probing. If the status changes, the reconfiguration operation of the spanning tree protocol is executed.

After SNOWNET bridges 305 form a spanning tree, the SNOWNET bridges 305 enter the learning and forwarding phase. In learning, each bridge 305 remembers through which port each endpoint MAC address can be reached.

Figure 6:
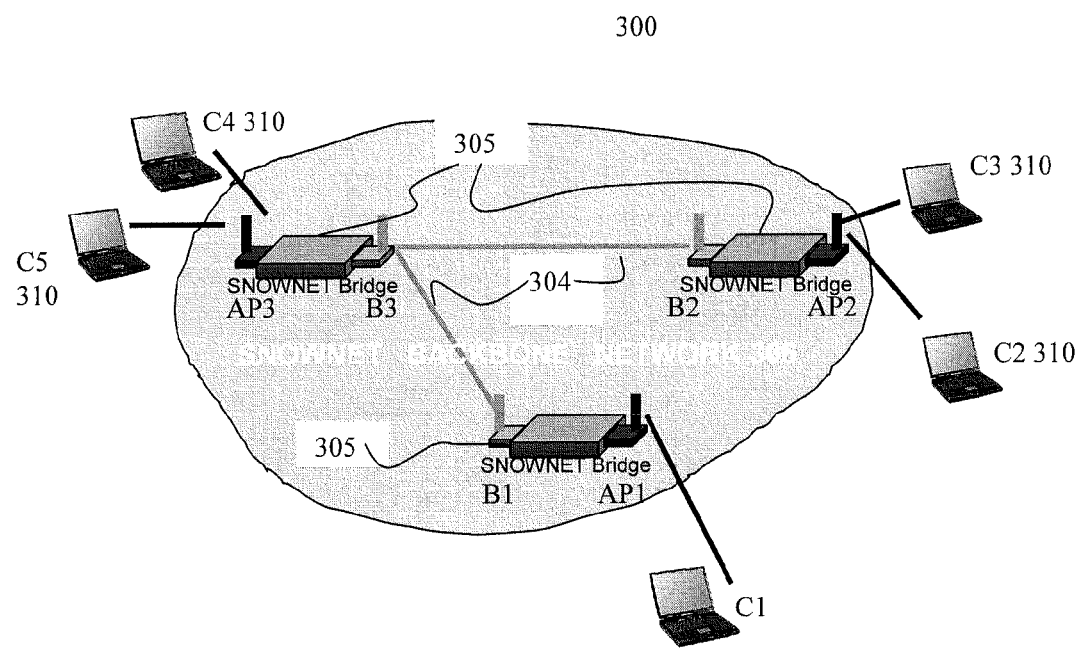
FIG. 6 is a diagram of an example of a SNOWNET spanning tree of the present invention.

FIG. 6 shows an example of a SNOWNET network 300 with a spanning tree created atop of the SNOWNET backbone network 306. The spanning tree includes SNOWNET nodes 302 configured as SNOWNET bridges 305.

As shown in FIG. 6, the SNOWNET backbone network 306 comprises SNOWNET bridges 305 (B1, B2, and B3), which provide local access services (AP1, AP2, and AP3, respectively) for clients 310 (C1 through C5).

FIG. 7 is a table of SNOWNET Bridging Table 400 Contents. Each SNOWNET bridge 305 of FIG. 6 includes a SNOWNET Bridging Table 400 stored in data storage memory 404 as shown in FIG. 7. The table 400 of FIG. 7 illustrates what is stored in each bridge's 305 table after the topology learning phase is complete. Compared to standard MAC bridges as specified by IEEE 802.1d, the difference is that the "port" column in standard MAC bridges is replaced by two columns in SNOWNET bridges 305: local interface and neighboring interface. These two addresses together identify a SNOWNET "bridge port", either logical or physical.

FIG. 8 shows the IEEE 802.11 Data Frame Address Field contents and possible values of the "To DS" and "From DS" fields. The IEEE 802.11 standard refers to the backbone network connecting the APs 104 as a "Distribution System (DS)". In each data frame, there are two bits, namely the "To DS" bit and "From DS" bit. Together they describe the transmission direction of the data frame and the operation mode of the protocol. For instance when a data frame is sent from an access point (AP), such as AP1 in FIG. 6, to a client, such as C1 in FIG. 6, the "To DS" bit is set to FALSE while the "From DS" bit is set to TRUE. The SNOWNET 300 network of the present invention utilizes the first three rows of FIG. 8. The first three rows are for ad hoc mode communication, AP to client communication, and client to AP communication. The fourth row describes the communication between APs, which is currently not used by SNOWNET bridges 305.

In each IEEE 802.11 data frame, there are four address fields. These address fields include different addresses according to the values of the "From DS" and "To DS" bits. When operating in ad hoc mode, IEEE 802.11 data frames include 3 addresses: destination address, source address, and the BSSID of the IBSS. The $4^{th}$ address in the data frame is not used by ad hoc mode data transmission. Such a data frame is identified if both the "To DS" and "From DS" fields of the data frame are set to 0. The SNOWNET network 300 of the present invention uses this format for backbone 306 communication.

When data frames are originated from a mobile client C, their address fields are set as specified by the 802.11 protocol standard. Its "To DS" field is set to 1 while the "From DS" field is set to 0. The first address is the BSSID of the access point to which the mobile client C attaches, which in SNOWNET 300 is provided by the local service access interface of the SNOWNET bridge. The second field contains the mobile client's own address while the third address is the address for the destination client C. The fourth address is left unused. The SNOWNET network 300 of the present invention uses this format for client C to SNOWNET bridge 305 communications. Similarly, the SNOWNET network 300 of the present invention uses the standard AP to client C format (To DS=0, From DS=1) to deliver frames to its attached clients C, again leaving the fourth address unused.

After the first SNOWNET bridge 305 (B1) receives a data frame that is destined for a device (such as client C5) not attached to the bridge B1, the SNOWNET bridge B1 reformats the frame to be forwarded through the backbone network 306. In the SNOWNET network 300 of the present invention, IEEE 802.11 standard is modified by utilizing the $4^{th}$ address field to hold the address of the SNOWNET bridge B1 interface transmitting the data frame.

A SNOWNET bridge 305 will always forward data frames for clients C attached to its local access service. For example, SNOWNET bridge B2 will forward data frames for clients C2 and C3. If both the source (for example, C2) and destination (for example, C3) of a data frame are using its local network access service, the data frame is forwarded via the local access interface. Otherwise the data frame is forwarded to the neighbor bridge (for example, B3) designated for Client 3, according to the learned MAC endpoints in the Bridging Table 400.

Upon receiving a data frame forwarded by a SNOWNET bridge (for example, B2), a SNOWNET bridge (for example B3) decides if the SNOWNET bridge B3 will further forward the frame by using a mechanism similar to the filter mechanism of IEEE 802.1d. A SNOWNET bridge B3 will only forward a data frame when the previous forwarder (the SNOWNET bridge from which the bridge received the data frame, as identified by the $4^{th}$ address field in the data frame, such as B2) is listed as an active neighbor bridge and the destination and the source of the data frame are on different sides of the bridge as indicated by the bridge address database (i.e., the destination and the source are listed as reachable via different ports). Before the data frame is forwarded, the bridge updates the $4^{th}$ address in the data frame to the address of its own transmitting interface.

At the bridge B3 that provides access services to the destination client C5, the data frame is converted again to the "from DS" type of data frame in the appropriate format.

Another possible embodiment of the above bridge port management and data frame formatting is to utilize the Wireless Distribution System (WDS) links defined by the 802.11 standard instead of ad hoc style communication we have described. WDS links are static links created by administrators between APs on the same wireless channel so the APs can exchange data via such a link. In this case, a SNOWNET bridge would monitor the identities of its neighboring SNOWNET bridges and dynamically create and/or tear down WDS links as the connectivity situation of the SNOWNET bridge changes.

An advantage of running SNOWNET 300 in bridge mode is to simplify network layer roaming and Internetwork Protocol (IP) address management. Since an entire SNOWNET 300 typically shares the same IP address space, there is no need for each SNOWNET bridge 305 to manage client IP addresses. One dedicated DHCP server within the SNOWNET 300 can serve the whole network 300. When a client C moves from one AP coverage area to another, there is no need to change its IP address. Other advantages of this situation include the simplified support of multicast and other link layer management protocols.

Since the Bridging Table 400 (shown in FIG. 7) corresponds to a per-host routing table, such a method may not scale well when the size of the SNOWNET network 300 grows. In addition, a spanning tree forwarding topology limits the shape and efficiency of data forwarding paths. In some cases the shortest forwarding path between two communicating clients cannot be used because their links are not part of the spanning tree. This is frequently the case in broadcast environments. Finally, bridges 305 update their address databases 400 and spanning tree by periodically exchanging "heartbeat" messages. Thus, when the backbone 306 topology changes or a client C changes its attached AP, it may take a relatively long period of time for the network to converge to a new state that reflects the new topology and attachments. Data packets may be lost during this transient period. In the worst case, the updates may not be able to catch up with the changes in the topology and the network becomes unstable.

In summary, the SNOWNET bridge mode is relatively simple, but it is best suited for small and moderately dynamic SNOWNETs 300.

The use of SNOWNET 300 in routing mode, however, overcomes the above-mentioned problems of Bridging mode.

Routing Mode

When SNOWNET nodes 302 operate in the routing mode, the SNOWNET nodes 302 form a flat routing space over the backbone network 306 (as opposed to hierarchical or clustered approaches). These SNOWNET nodes 302 are referred to as SNOWNET routers 305 when operating in routing mode. In this case, the backbone network 306 is viewed as a variation of a Mobile Ad hoc Network (MANET) (IETF Mobile Ad-hoc Networks (manet) Working Group, on the world wide web at ietf.org/html.characters/manet-charter.html) and research results on MANET routing algorithms can be borrowed for SNOWNET routing (C. Perkins, E. Belding-Royer, and S. Das, "Ad hoc On-Demand Distance Vector (AODV) Routing", IETF Internet Draft "draft-ietf-manet-aodv-11.txt", Work in Progress, June 2002; D. Johnson, D. Maltz, Y. Hu, and J. Jetcheva, "The Dynamic Source Routing Protocol for Mobile Ad Hoc Networks (DSR)", IETF Internet Draft <draft-ietf-manet-dsr-07.txt>, Work in Progress, February 2002; etc.).

However, SNOWNET 300 represents an important special case within the class of MANETs. In SNOWNET 300 there are two distinct types of entities in the network that can be mobile: clients 310 and SNOWNET nodes 302. However, current MANET research treats the whole MANET as a flat routing space in which there is no structure in the MANET topology and each client is a node that participates equally in data forwarding. This typically imposes special requirements to enable MANET functionality on all nodes in the network. In the SNOWNET service model 300, the special requirements on mobile clients 310 are limited so that users may employ standard typical mobile computers such as Laptops, PDAs and other commercially available devices with standard client communication devices such as widely available 802.11b PCMCIA cards. Thus, directly applying an existing MANET approach by configuring both clients and SNOWNET nodes 302 as MANET nodes is not a viable solution.

With SNOWNET routers 305, a hybrid approach is introduced. In this approach, only the SNOWNET routers 305 are configured as MANET nodes and participate in MANET-like routing algorithms. All router backbone interfaces share the same IP address space and execute the routing protocols and exchange routing information among themselves. Eventually they together build routes for reaching any backbone nodes.

Among the differences in SNOWNET routing and MANET routing is that each SNOWNET router 305 is also allocated mask-able address space segments from which addresses are dynamically assigned to this router's local clients. DHCP server software is installed on each router to allocate IP addresses for local mobile clients. During routing information exchanges, in addition to advertising for their own IP addresses, backbone nodes also advertise for their local service subnets. In other words, the backbone nodes proxy for their local service subnets by including this information in their reachable network list. This special requirement requires modifications to a "normal" MANET routing protocol specification by requiring an additional field in the SNOWNET routing protocol messages to include these proxy subnets. This field may include multiple entries and hence is referred to as the "proxy list".

In order to support roaming, in addition to the local service subnets, each SNOWNET router 305 is responsible for providing a proxy service for a number of "foreign mobile clients", which are mobile clients 310 currently attached to the router but with addresses outside of the router's address spaces. The advertisement of these foreign client addresses is included in the SNOWNET routing protocol message in the same way as the local service subnets, as entries in the proxy list.

Each SNOWNET router 305 maintains a Routing Table 500, shown in FIG. 9. The Routing Table 500 specifies the local interface and the neighboring interface to the respective portable network node device that is the next hop-destination in a routing path.

In each routing table 500, there are two types of route entries: subnet routes and host routes. The former are aggregated route entries where each entry describes routes for all the hosts within the corresponding address space, expressed in traditional format as a combination of network address and network mask. The latter are for the routes towards specific mobile nodes 302, either the backbone interface of SNOWNET nodes or foreign mobile clients. In the examplerouting table 500, the entries for B1, B2, and B3 are host routes for SNOWNET node backbone interfaces, the entries for C5 are a host route for a foreign client, and the entries for AP1, AP2, and AP3 subnets are subnet routes. A longest match rule (W. Doeringer, G. Karjoth, and M. Nassehi, "Routing on longest-matching prefixes, IEEE/ACM Transactions on Networking (TON), Vol. 4, Issue 1, February, 1996) can be applied during route lookups.

A client C may wander off the service coverage area of one SNOWNET router and move to the coverage area of another SNOWNET router 305. SNOWNET 300 supports client roaming so that there is no data interruption during the change of client attachment. For stationary computers, IP addresses serve both as identifiers and location indicators. However, when an IP address is assigned to a mobile client 310, these two properties contradict each other when the mobile client changes its attachment. In one embodiment, the IP address should be the same so that the integrity of the client identity is maintained. In another embodiment, the client should acquire a new address to reflect its current network access attachment for efficient routing.

The SNOWNET router 305 solves this problem by allowing two types of routes to co-exist. For those clients 310 who stay with their original SNOWNET routers, the subnet routes for their subnets represent their routes. There is no specific route for each individual client of this type. For those clients who have left their original subnet and become "foreign clients" for other routers, each routing table explicitly lists their routes. Because of the support for "foreign mobile client", there is no need for the client to acquire a new IP address in the address space of its current attachment environment while it is still within the SNOWNET 300.

When a mobile client 310 moves to a new subnet, the mobile client 310 informs its previous router 305 about its new attachment by forwarding to its previous router 305 a Routing Update Message 600 (an example of which is shown in FIG. 10).

More particularly, FIG. 10 shows a Routing Update Message 600, also referred to as a notification, in which a mobile client 310 notifies its previous service SNOWNET node 305 about the address of its current service SNOWNET node. The message 600 includes the identities of the three parties involved in the activities, as well as security related information such as a certificate encrypted using the client's private key and the previous service SNOWNET node's public key.

This notification 600 shortens the time period or gap between the time the client breaks off from its previous router and the time its new route is inserted into every routing table in the backbone network. During this time period, data packets destined for this mobile client 310 is delivered towards the client's previous service router 305 and the previous service router 305 is not able to further forward data packets to the mobile client. With the notification, the previous router is able to forward data packets to the new router 305 before all routing tables 500 are updated. Such a notification 600 will not totally eliminate the gap, but significantly reduces the duration of the gap to the period from the time the client breaks off from its previous router to the time that the client's Routing Update Message 600 arrives at its previous service router. Since mobile clients 310 typically move between neighboring coverage areas, it is likely that their previous and current service routers 305 are very close in distance (or number of link hops) in the backbone network 306 topology. Thus the notification will arrive relatively quickly. Each router 305 may optionally cache data packets for a client 310 if the data packets cannot be delivered to the clients. Once the notification 600 about the client's new router 305 arrives, cached data packets are forwarded to the new router 305. Also, upon receiving such a notification 600, if the client 310 is a foreign client on its previous router 305, the client 310 is removed from the previous router's "foreign client" list.

A foreign client in SNOWNET 300 is served differently by the network from how a mobile client 310 is served by a foreign agent as specified in the well known Mobile IP (C. Perkins, "IP Mobility Support", IETF RFC 2002, October, 1996). In Mobile IP, when a mobile client is attached to a network other than its home network, the mobile client acquires a local IP address, termed "foreign address", from its current network. The network to which the mobile client currently attaches is known as the "foreign network". The mobile client always maintains its address on its home network. This address is known as the mobile client's home address or permanent address. When other hosts on the Internet want to communicate with the mobile client, they will address their communications using the mobile client's home address. When the mobile client is on a foreign network, it receives incoming traffic with the help of an entity on its home network, its home agent. Incoming traffic is sent to the mobile client's home network by the Internet. Then the home agent captures the packets for the mobile client and forwards them to the mobile client's current location using its new local address. For this scheme to work, the mobile client is required to report its local address on a foreign network to its home agent. By using two addresses (home address and foreign address) simultaneously, the Mobile IP solves the conflict between the attachment and identity purposes of addressing.

In SNOWNET 300 of the present invention, there is no need for a mobile client 310 to receive a new IP address. When the mobile client enters SNOWNET 300 for the first time, the mobile client receives an IP address from the SNOWNET node 302 it is associated with. Because the network 300 is capable of forwarding data for specific hosts, it is not necessary for a mobile client to obtain new foreign address when it moves to the coverage area of a SNOWNET node 302 that is different from its initial node. The network 300 propagates routes for the mobile client reflecting its current attachment. SNOWNET 300 has such a capability because it operates on a scale that is much smaller than the Mobile IP's environment. Thus SNOWNET 300 can install per-host routes in the network for these mobile clients. On the other hand, SNOWNET 300 can easily support Mobile IP as well. A Mobile IP-capable mobile client may simply report its SNOWNET address to its home agent as its foreign address. This results in more efficient operation of Mobile IP in a SNOWNET 300 environment.

As disclosed herein above, SNOWNET comprises a mobile network solution which provides secure and portable wireless networking service to mobile users with devices equipped with wireless network interfaces. The Secure Nomadic Wireless Network, or SNOWNET, follows a hierarchical approach. Special SNOWNET nodes are deployed in the area where networking service is needed and form a backbone network. At the same time, SNOWNET nodes provide local access service to regular mobile clients.

The SNOWNET of the present invention is portable and can be rapidly deployed in an environment where there is no existing networking infrastructure. SNOWNET is secure. Using SNOWNET extensions to the IEEE 802.1x in the PASS algorithm, all traffic transmitted within SNOWNET is highly protected. SNOWNET also provides an enhanced scheme for transferring authentication and security during handoff to support smooth, rapid mobile client roaming. Finally, SNOWNET offers two operation modes for automatically forwarding messages and that provide seamless roaming between different local service cells.

SNOWNET can be used in several different scenarios. Here are some examples. SNOWNET can be setup as a secure fast-deployable standalone networking infrastructure to provide instant networking services to a field where there is no trusted networking environment. Typical usages may include battle field situations, disaster relief operations, scientific exploration tasks, and robotics applications. SNOWNET can be installed as a cost-efficient multi-hop wireless LAN to provide wireless networking coverage for any organization. With a flexible, multi-hop, self-organized, and self configured wireless backbone, SNOWNET saves customers costs for cabling, installation and maintenance. SNOWNET may also be used as a stub network to connect isolated LANs to an organizational network. For instance, a school may use SNOWNET to "glue" a LAN installed in a remote building to its existing campus network.

Features of the present invention described above include:
The SNOWNET architecture for a 2-level secure, portable wireless router network device based on extensions to the IEEE 802.1x standard.

The PASS algorithm for securely adding and authenticating a router to an existing SNOWNET.

A self-configured address management scheme for SNOWNET to allocate addresses for their backbone interfaces and local service networks.

A bridging protocol involving modification to the IEEE 802.11 standard to provide operational compatibility with the IEEE 802.1d and 802.1w bridging standards.

A new routing algorithm that is a hybrid approach based on traditional MANET routing algorithms.

Support for efficient network level roaming for mobile client between difference service areas of the SNOWNET.

Support for an enhanced mechanism for efficient handoff of authentication and security when mobile client is roaming between difference service areas of the SNOWNET.

The system also includes permanent or removable storage, such as magnetic and optical discs, RAM, ROM, etc. on which the process and data structures of the present invention can be stored and distributed. The processes can also be distributed via, for example, downloading over a network such as the Internet.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An authentication method for clients that move among wireless service areas provided by multiple nodes, said mobile client authentication method comprising:
   implementing communication via a client, using a key generated after client authentication has been performed, said client carrying out the communication encoded using said key in a wireless service area provided by a first node that possesses said key;
   sending, when determining that the client moves from the wireless service area of the first node to the wireless service area of a second node, a message including at least information on said key to the second node, and
   enabling the client to carry out encoded communication in the wireless service area provided by the second node, when the second node is able to confirm that at least the information on said key is identical to that of said key possessed by the first node.

2. The authentication method as described in claim 1, wherein in said authentication, the client is authenticated via the first node in accordance with the authentication procedures stipulated by IEEE 802.1X.

3. The authentication method as described in claim 2, wherein when the second node is able to confirm that at least the information on said key is identical to that of said key possessed by the first node, the client is able to carry out encoded communication in the wireless service area provided by the second node without following the authentication procedures stipulated by IEEE 802.1X.

4. The authentication method as described in claim 1, wherein said message includes at least information identifying the first node.

5. The authentication method as described in claim 1, wherein at least one node includes an interface for providing trunk communications in addition to an interface that provides a wireless service area.

6. A node that receives authentication from another node and, when a client carrying out mobile communication encoded using a key in the wireless service area provided by said other node moves, provides wireless service to said client, said node comprising,
- a reception unit that receives a message including at least information on the key from said client when receiving authentication from said other node, when said client is moving to the wireless service area of its node, and
- a unit that enables said client to carry out encoded communication in the wireless service area, when the information on the key received from the client can be confirmed as being the same as said key in said other node.

7. The node as described in claim 6, wherein in said authentication, the client is authenticated in accordance with the authentication procedures stipulated by IEEE 802.1X.

8. The node as described in claim 7, wherein said client to carry out encoded communication in the wireless service area is able to confirm that at least the information on said key is identical to that of said key, said client is able to carry out encoded communication without following the authentication procedures stipulated by IEEE 802.1X.

9. The node as described in claim 6, wherein said message includes at least information identifying the node in question.

10. The node as described in claim 6, comprising:
- an interface that provides a wireless service area, and an interface for providing trunk communications.

\* \* \* \* \*